(12) United States Patent
Colmant et al.

(10) Patent No.: US 7,050,440 B2
(45) Date of Patent: May 23, 2006

(54) METHOD AND STRUCTURE FOR VARIABLE-LENGTH FRAME SUPPORT IN A SHARED MEMORY SWITCH

(75) Inventors: Michel Colmant, Erlenbach (CH); Ferdinand Gramsamer, Wettswil (CH); Cyriel Minkenberg, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 713 days.

(21) Appl. No.: 09/994,468

(22) Filed: Nov. 26, 2001

(65) Prior Publication Data

US 2002/0196778 A1    Dec. 26, 2002

(51) Int. Cl.
*H04L 12/28* (2006.01)
*H04L 12/56* (2006.01)

(52) U.S. Cl. .................. 370/395.1; 370/398; 370/422; 370/389

(58) Field of Classification Search ................ 370/389, 370/394, 395.1, 395.42, 229, 230
See application file for complete search history.

(56) References Cited

U.S. PATENT DOCUMENTS

| | | | | |
|---|---|---|---|---|
| 5,311,509 A | * | 5/1994 | Heddes et al. | 370/397 |
| 5,602,841 A | * | 2/1997 | Lebizay et al. | 370/413 |
| 5,689,505 A | * | 11/1997 | Chiussi et al. | 370/388 |
| 6,160,812 A | * | 12/2000 | Bauman et al. | 370/416 |
| 6,205,145 B1 | * | 3/2001 | Yamazaki | 370/395.65 |
| 6,754,216 B1 | * | 6/2004 | Wong et al. | 370/395.42 |
| 2002/0087716 A1 | * | 7/2002 | Mustafa | 709/236 |

* cited by examiner

*Primary Examiner*—Huy D. Vu
*Assistant Examiner*—Lina Yang
(74) *Attorney, Agent, or Firm*—Anne Vachon Dougherty (57) ABSTRACT

The present invention relates to switching in electronic networks. Many data transmission protocols and technologies used in such networks, such as TCP/IP and Ethernet, use variable-length packets for transmission. Often however, the nodes that make up these networks typically contain high-speed cell switches that only support fixed-size data units. To support variable-length packets in such a fixed-size cell switch non-interleaving switching and transmission must be offered. The present invention provides such a solution in essence by segmenting a variable-length frame into a plurality of fixed-length cells including a start-of-frame cell, one or more continuation cell(s), and an end-of-frame cell and routes said fixed-length cells through said switch, thereby providing, at an output of said switch, subsequent and deadlock-free transmission of consecutive cells of a certain frame, and block any cell of a different frame from interleaving. This leads to better average delay characteristics and removes the need for packet reassembly.

15 Claims, 7 Drawing Sheets

METHOD AND STRUCTURE FOR VARIABLE-LENGTH FRAME SUPPORT IN A SHARED MEMORY SWITCH

FIELD OF THE INVENTION

The present invention relates to switching in electronic networks. Many data transmission protocols and technologies used in such networks, such as TCP/IP and Ethernet, use variable length packets as their transmission units. However, the nodes that make up these networks typically contain high-speed cell switches that only support fixed-size data units. It would be desirable to support variable length data units in such a fixed-size cell switch by offering non-interleaving switching and transmission of such data units. This would remove the need for packet reassembly and lead to better average delay characteristics.

Additionally, many such networks use so-called multicast, i.e. the duplication of one incoming data unit to multiple outputs, and Quality-of-Service (QoS) provisioning, i.e. service differentiation among classes of traffic, as important functions. Consequently, multicast and QoS support must today be offered by any switching fabric.

INTRODUCTION AND PRIOR ART

A common implementation of high-speed cell switches, e.g. as described by W. E. Denzel, A. P. J. Engbersen, and I. Iliadis in "A Flexible Shared-Buffer Switch for ATM at Gb/s Rates", published in Computer Networks and ISDN Systems, Vol. 27, No. 4, Jan. 1995, pp. 611–624, adopts an output-queued, shared-memory approach. Integrating the functions of multicast, QoS support, and variable-length data units in such an architecture entails a number of possible deadlock scenarios, which must be addressed in order to prevent switch operation from being stalled indefinitely.

The method described presently builds on top of fixed-length cell switches and is completely orthogonal to any other feature in such a switch. That is, it does not harm the performance in terms of latency or throughput, if used as conventional cell based switch. It is also orthogonal to the both the multicast functionality and the QoS functionality, e.g. traffic priorities, that is addressed in such switches.

An existing architecture is described by C. B. Stunkel et al in "implementing Multidestination Worms in Switch-based Parallel Systems: Architectural Alternatives and their Impact", Proceedings of the 24th ACM Annual International Symposium on Computer Architecture (ISCA '97), June 1997, Denver, Colo. USA. They disclose several ways to implement what they call "multidestination worms", which are somewhat similar to multicast frames discussed here. Their preferred solution is a hybrid central buffer/crossbar solution, although the crossbar is really only used to route unicast traffic with low latency. To avoid deadlocks, Stunkel et al take the approach to assure in advance that a frame can be stored in its entirety in the shared buffer. The head-of-frame is not admitted into the switch before this condition is met. This does not imply that, at the time of admittance, there is sufficient space to fit the entire frame, but eventually, through frames exiting the switch, there will be enough space freed to store the entire frame.

A drawback of this approach is that the shared buffer must be at least as large as the largest frame to be switched, which is a rather undesirable and hardly foreseeable restriction.

To achieve the above objectives, i.e. to reduce the delay and avoid the need for reassembling variable length packets in a switch with fixed-length cells, the present invention essentially aims at

- offering a deadlock-free support for a variable-length packet mode frame mode hereinafter),
- extending this frame mode with multicast support in a deadlock-free fashion, and
- enhancing this frame mode with multiple priorities, such that frames of higher priority destined to the same output may preempt the current frame, but not if they are of the same or lower priority.

Thus, the present invention uses resources more efficiently because the shared buffer or shared memory does not have to be as large to store an entire frame as the above described approach by Stunkel et al.

In other words, the present invention enhances fixed-length cell switches to support also variable-length packets, a packet being composed of a plurality of cells, such that the switch can be used as a conventional fixed-length cell switch without any disadvantages. Thus, the present invention enables a conventional fixed-length cell switch to be used in ATM networks as well as multiprocessor message passing environments, such as SP2 type of environments, that are typically used for parallel computation. To summarize, the great benefit of the present invention is that it unifies different switch designs tailored for different type of networks into one single architecture.

THE INVENTION

For the above objectives, the invention provides a solution by providing a novel approach as well as suggested embodiments, i.e. a practical hardware implementation, which—at a modest cost in terms of additional hardware—combines the concepts of both multicast and frame mode in an elegant manner and preferably in a single-chip switch fabric, based on an output-queued, shared memory architecture, while sacrificing none of the performance advantages of such an architecture.

The major advantages of the approach according to the invention are the seamless integration, from a switching point of view, of unicast and multicast frames, and the cost-efficient merging of three highly desirable features into one switching fabric.

Whereas the traditional cell switch's application range was usually quite limited, the addition and integration of both frame mode and multicast functionality enables this type of switch fabric to find applications in a wide range of products:

- the traditional ATM world,
- the router world (native support for variable length TCP/IP packets),
- the Ethernet world (native support for variable length Ethernet frames),
- the (mainframe) server world (as a high-speed interconnect to cluster servers together, instead of the traditional mesh), and/or
- the parallel processing world (as a replacement for the traditional bus structure to interconnect processors and memory).

In the description below, the following expression notation will be used:

OP (i:range(i):expr(i));

where OP can be any binary operator, i is a dummy variable, range(i) expresses a range (and/or condition) for variable i, and expr(i) can be any expression, usually also a function of i. This notation is shorthand for expr($i_0$)op expr($i_1$)op . . . expr($i_{n-1}$)op expr($i_n$)

where $i_0$ through $i_n$ are the values of i that satisfy the range(i) condition.

The System

Figure 1:
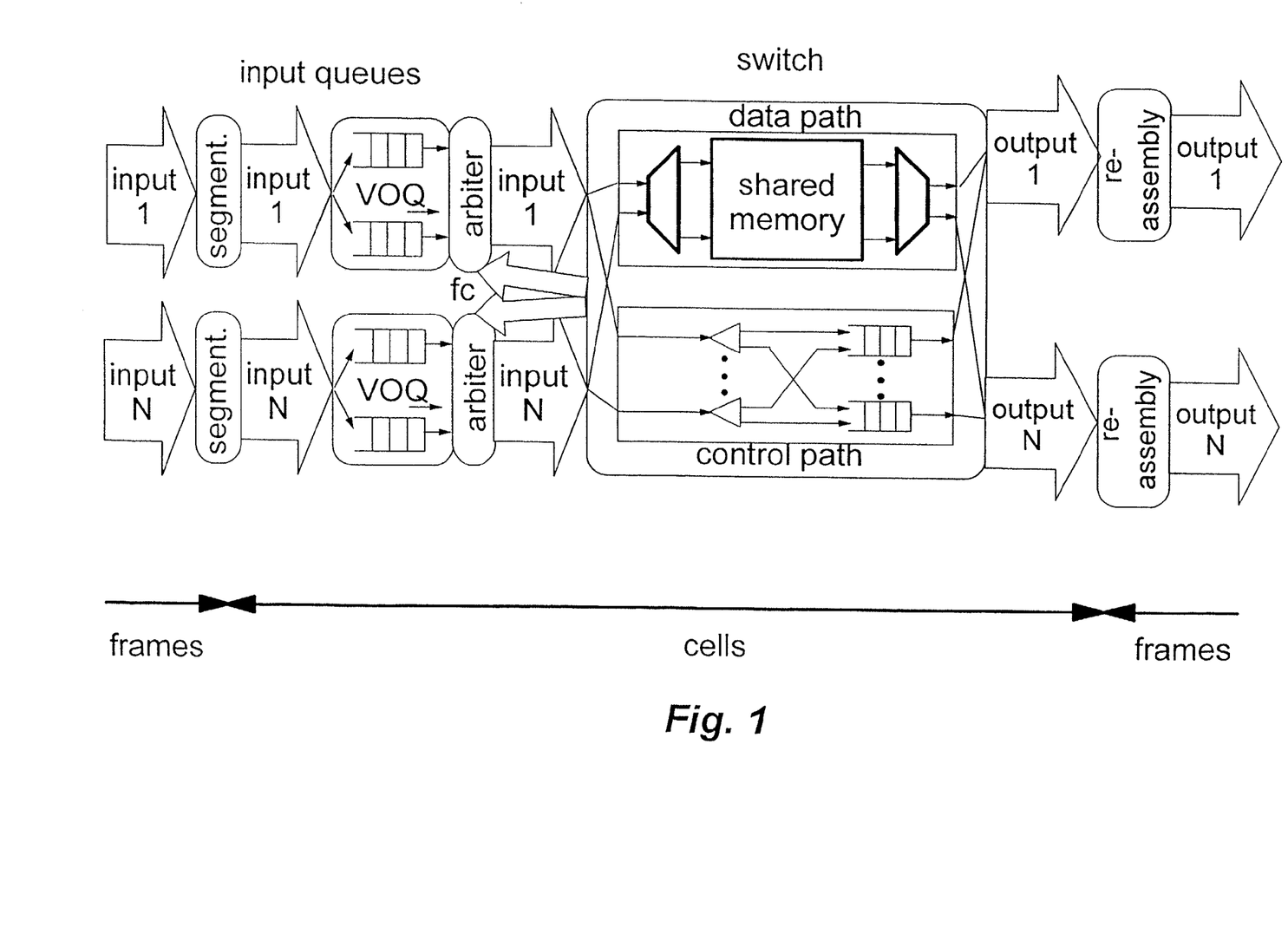
FIG. 1 the system level architecture, already discussed above.

FIG. 1 displays the system level architecture. We assume a system dimension of N inputs×N outputs, i.e. N×N, although the invention is not limited to systems with equals numbers of inputs and outputs. At the input side, variable-length data units arrive and are segmented into fixed-length cells by the segmentation units. These cells are forwarded to the input queues, where they are stored according to their destination. This is often called "virtual output queuing", VOQ. The input queue arbiter makes a decision on which start-of-frame cell to forward, taking into account OQ grant and memory grant information. This system is described by C. Minkenberg, A. P. J. Engbersen, and M. Colmant in "A Robust Switch Architecture for Bursty Traffic", published in *Proc. Int. Zurich Seminar on Broadband Communication IZS 2000*, Zurich, Switzerland, 15–17 Feb.2000, pp. 207–214.

Strict first-in-first-out, FIFO order of cells destined to the same output and of the same priority must be maintained in order to guarantee frame integrity. Although not mandatory for correct system operation, it is recommended that frames are transmitted from the input queue without interleaving of cells from frames to other outputs, that is, once a start-of-frame cell has been selected, the input queue forwards the corresponding continuation and end-of-frame cells in subsequent time slots, again always taking grant information into account. Other start-of-frame cells are only considered for transmission once the current frame has been completed, i.e. just after an end-of-frame cell has been transmitted.

Cells are forwarded to the switch, which routes them to their proper destination(s). The cells emerging at the egress side of the switch are then reassembled into frames by the reassembly units. In case frame mode is enforced, this unit will have no functionality, except perhaps stripping off the switch's internal cell headers. The internal organization of the switch is such that the control section only handles memory addresses, while the data is passed through the shared memory, as described by W. E. Denzel, A. P. J. Engbersen and I. Iliadis in "A Flexible Shared-Buffer Switch for ATM at Gb/s Rates", published in *Computer Networks and ISDN Systems*, Vol. 27, No. 4, January 1995, pp. 611–624.

The shared memory configuration is known to be well suited for implementation of multicast transmission—the data is stored only once, while the corresponding address is duplicated to all destination queues. A counter associated with the memory address, initially set to the number of copies to be transmitted, is decremented for every copy that leaves the switch, and the address is only released when the counter reaches zero, i.e. the last copy has left the switch.

The switch employs a flow control mechanism consisting of two signals:

a shared memory grant $G_{i,SM}$, based on memory occupancy $O_{SM}$. When the memory fill exceeds a programmable threshold $T_{SM}$, the shared memory grant is removed. The input queues are not allowed to send any more cells as soon as they detect this condition. Note that, for now, the shared memory grant is not actually a function of the input i.

$$G_{i,SM} := O_{SM} < T_{SM}, \text{ where } 0 \leq i < N. \quad (1)$$

a per-destination grant $G_i(j)$, based on output queue occupancy $O_Q(j)$. This is a vector of size N, of which bit j corresponds to the status of output queue j. When the output queue fill exceeds a programmable threshold $T_Q(j)$, the corresponding output-queue grant is removed by resetting the corresponding bit in the per-destination grant vector. When the input queues detect this condition, they will not send any more cells destined to this output.

$$G_i(j) = O_Q < T_Q(j), \text{ where } 0 \leq i,j < N. \quad (2)$$

Note that the terms "per-destination grant" and "output-queue grant" are used interchangeably.

Additionally, the output queues are assumed to be of such size that one can fit all memory addresses. Cells are always accepted as long as there are shared memory addresses available, regardless of output queue status. The unavailability of a shared memory address is flagged as a fatal error condition, since this would imply the loss of a cell.

The Frame Mode

A frame is defined to be a variable length data unit, equivalent in size to a multiple of the fixed cell size of the switch. In order to transmit a frame, it is segmented into smaller, fixed-length cells, which are subsequently routed through the switch. Thereby, the first cell of a frame is termed the start-of-frame cell, any subsequent cells before the last one continuation cells, and the last one end-of-frame cell. If no additional precautions are taken, cells from different frames (arriving from different inputs) may be interleaved on one output, so that frame reassembly is required. Therefore, it is desirable to transmit frames in a non-interleaved fashion, which leads to better average frame delay characteristics. This mode of operation is henceforth referred to as frame mode.

Unfortunately, introducing the frame mode leads to a number of possible deadlock conditions, namely:

output queue deadlock and shared memory deadlock due to unicast traffic, shared memory deadlock due to multicast traffic, and shared memory deadlock due to multiple traffic priorities.

In general, these deadlocks occur because an output is waiting for a continuation cell of the frame it is currently transmitting, but this cell cannot enter the switch due to an output queue full or a shared memory full condition.

DETAILED DESCRIPTION OF THE FUNCTION AND OF AN EMBODIMENT

In the following more detailed description, the function of the invention will be described first. Subsequently, a hardware implementation will be disclosed. This description is supported and completed by the appended drawings which illustrate several examples, namely in.

UNICAST DEADLOCK PREVENTION

First, it will be explained how to prevent deadlock conditions from occuring when only unicast traffic (traffic with only a single destination) is considered.

The output-queue-full deadlock condition occurs when the output queue threshold is crossed while there are no more continuation cells of the current frame in the queue. Since the queue is marked full, they will also not be allowed to enter the switch, hence deadlock occurs.

The shared memory deadlock is similar. When the shared memory threshold is crossed (the memory is "full"), all inputs are blocked from sending any more cells, possibly preventing the required continuation cells from entering the switch, which in turn prevents the switch from freeing up the memory addresses needed in the first place.

Figure 2A:
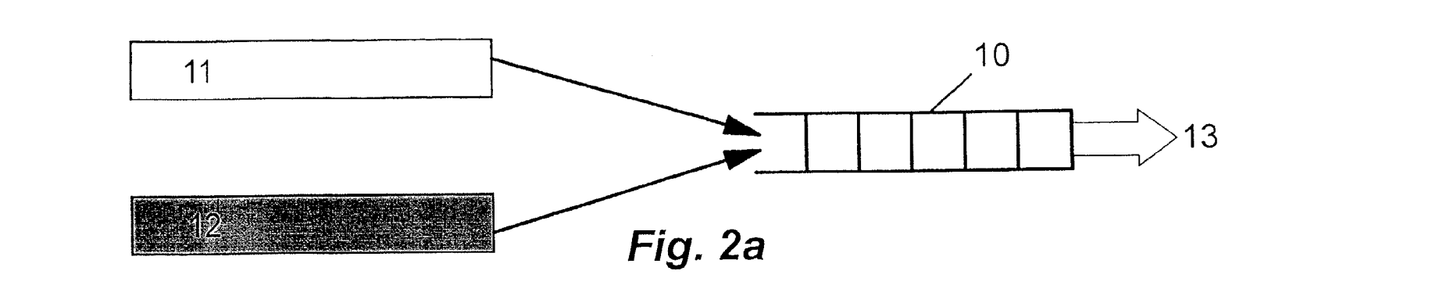
FIGS. 2a–2c the frame mode deadlock.
Figure 2B:
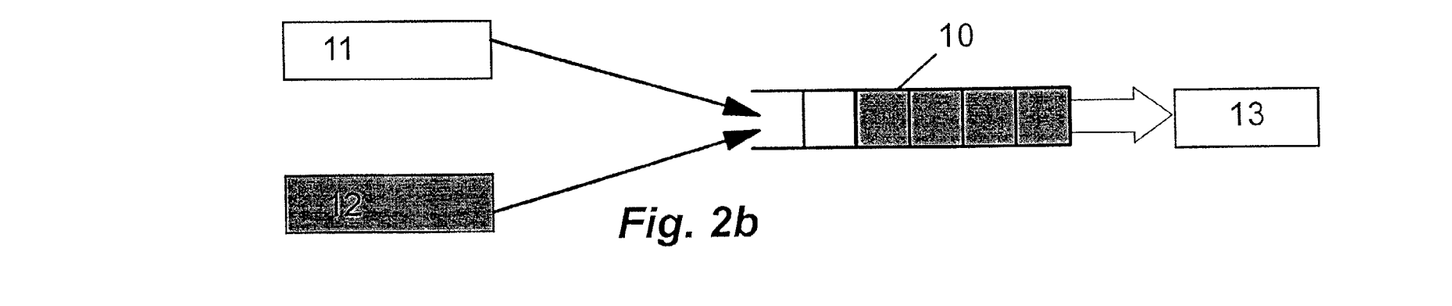
Figure 2C:
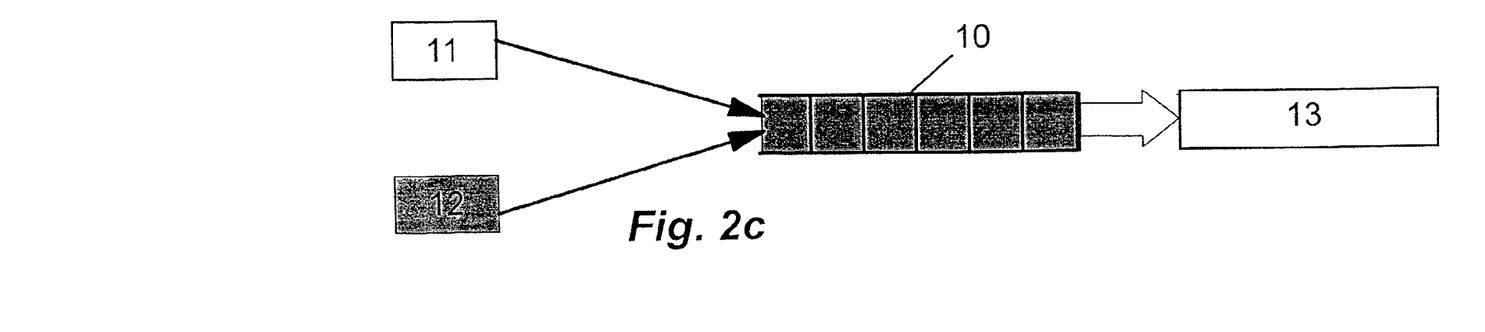

FIGS. 2a to 2c illustrate the deadlock. Two very long frames, a first frame 11 and a second frame 12 have the same destination, of which frame 11 is being transmitted. Before frame 11 finishes its output 13, the output queue 10 (or the shared memory) fills up with cells for frame 12, until the queue full threshold (or the shared memory threshold) is crossed, preventing further cells from entering the switch.

To circumvent these deadlock conditions, the novel concept of active inputs was developed: Definition 1 (Active Concept): An input i is defined as being active with respect to output j when on output j a frame that arrived on input i is being transmitted. The active states are represented by the boolean vectors $A_i(\bullet)$. An input is said to be active, represented by $A_i^*$, when it is active with respect to at least one output:

$$A_i^* := \exists (j: 0 \leq j < N : A_i(j) = \text{true}) \quad (3)$$

"Being transmitted" in this sense means that the start-of-frame cell of said frame has been transmitted, while the end-of-frame cell has not yet been. A frame being transmitted is also called an active frame and the output it is being transmitted on is an active output.

Additionally, an almost full condition is defined for the shared memory. A programmable almost full threshold $T_{AF}$ is compared to the current memory occupancy $O_{SM}$. Assuming a flow control delay equivalent to D cell slots between switch and adapter, this threshold should be programmed smaller or equal to the memory full threshold minus D times the number of ports N:

$$T_{AF} \leq T_{SM} - D*N. \quad (3a)$$

When the shared memory occupancy is above this threshold, the shared memory is said to be almost full. This threshold is programmed to some value below the actual memory full threshold, satisfying equation (3a).

Now, compared to the conventional flow control of equations (1) and (2), the outgoing flow control to the adapters is modified as follows for the shared memory grant $$G_{i,SM}^* := (\neg (O_{SM} > T_{AF}) \lor A_i^*) \land \neg (O_{SM} > T_{SM}), \quad (4)$$

while the output queue grants are now determined by $$G_i(j) := \neg (O_Q(j) \geq T_Q(j)) \lor A_i(j), \text{ with } 0 \leq i \leq N \text{ and } 0 \leq j \leq N. \quad (5)$$

Note that this equation does not impose a maximum queue size limit for active inputs. Therefore, the output queue size is assumed to be at least as large as the shared memory.

The above equations (4) and (5) can be read as follows:

An input i receives shared memory grant if and only if ((the shared memory is not almost full) OR (input i is marked active)) AND (the shared memory is not full).

An input i receives output grant for output j if and only if (output queue j has not exceeded its threshold) OR (input i is marked active for output j).

Note that the switch resorts to a crossbar-like mode of operation when the almost-full threshold is exceeded, because then only one input is allowed to send to an active output, i.e. there is a one-to-one matching between (active) inputs and outputs, just like in a crossbar. Note also that both shared memory grant as well as per-destination grant are determined on a per-input basis now.

This scheme solves the output queue deadlock because it ensures that the output queue grant for the input that may still have to send the rest of the frame is positive as long as the frame has not been completed, thus allowing it to bypass the output queue full condition. Note that only this input gets a positive grant for this output. The active status for an input must be marked on a per output basis because an input can actually be active for multiple outputs at the same time. If the input queue does not interleave frames to different outputs, it is guaranteed that only one of these frames is not entirely in the switch yet Furthermore, this scheme also solves the shared memory deadlock. Recall that this deadlock occurs because the inputs that have the required continuation cells cannot send because the switch is full, and the switch cannot free up memory addresses because it needs those continuation cells. What is achieved by the active scheme is that when the switch is almost full, i.e. close to the full threshold, but there are still some addresses available, those addresses for sure go to the inputs that need them.

Another way of looking at it is that, when almost full, it is guaranteed that at least as many cells exit the switch as enter, ensuring that the memory occupancy does not grow further, preventing the memory from reaching the full threshold. That the previous statement holds true can easily be seen when realizing that there are never more active inputs than there are frames being transmitted (no output can be busy transmitting frames from more than one input), and hence, in each cycle at least as many cells leave the switch on the active outputs, as enter on the active inputs.

Multicst Deadlock Prevention

The above approach solves the deadlock problem for the unicast case, in multicast traffic however, another deadlock scenario presents itself. The essence of this new problem is that cell transmission and address recycling are no longer directly coupled, because a cell being transmitted, i.e. leaving the switch, will only free up a memory address when it is the last copy of that cell. In unicast, this always holds true, because there is only one copy to be transmitted, but for multicast cells, the active concept described above is no solution.

Figure 3:
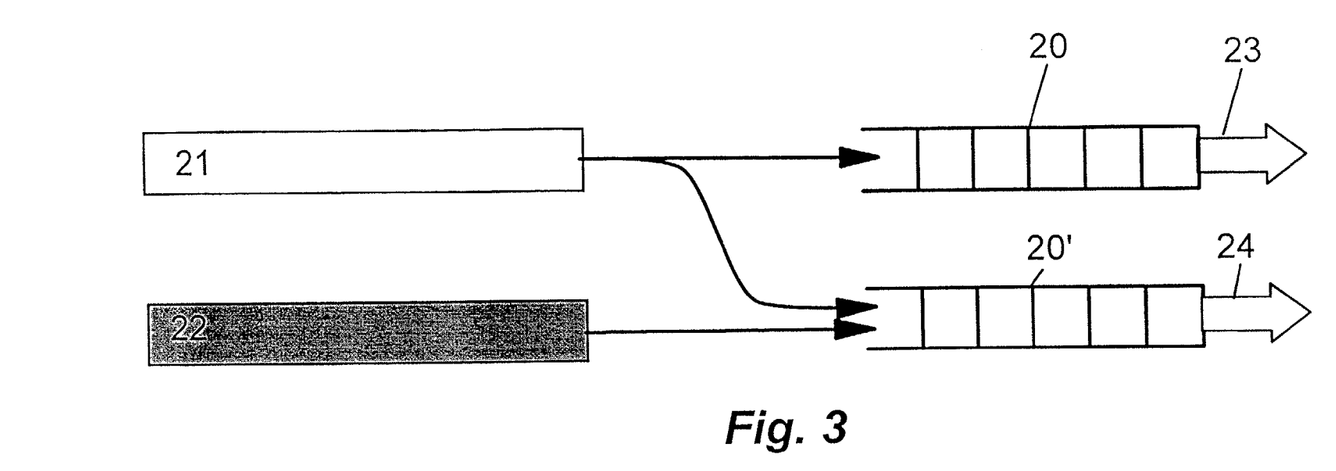
FIG. 3 an active concept unusable for multicast.

Consider FIG. 3, where two very long frames, a multicast frame 21 and a unicast frame 22 go through the switch, resulting in outputs 23 and 24. Multicast frame 21 is destined for both outputs 23 and 24 and is assigned a multicast vector indicating 2 the plurality of outputs of the switch, unicast frame 22 is destined for only for output 24.

Frame 21 is being transmitted on output 23, frame 22 on output 24. According to the active concept, both inputs 21 and 22 are active, allowing continuation cells from both frames to enter the switch. However, because the cells from multicast frame 21 still need to be transmitted on output 24 as well, their memory addresses are not freed. This causes at least one of the memories 20 or 20' to fill up with cells for frame 21 until the memory full threshold is crossed, causing the switch to enter a deadlocked state.

This problem can be solved by introducing the extended active concept, which replaces the active concept of Definition 1.

Definition 2 (Extended Active Concept): An input i is defined as being active with respect to output j when on this output j a frame that arrived on input i is being transmitted and it is the last copy of the frame. The active states are represented by the boolean vectors $A_i(j)$. An input is said to be active, represented by $A_i^*$, when it is active with respect to at least one output:

$$A_i^* := \exists (j : 0 \leq j < N : A_i(j) = \text{true}) \qquad (6, \text{identical to } 3)$$

The rules for determining the shared memory and output queue grants remain unchanged. Note the addition of the qualification that an input is only marked active if the last copy of the frame is being transmitted. This guarantees that the addresses are really being freed as the cells leave the switch, so that cell transmission and address recycling are once again coupled for active inputs. Also note that this extended definition of the active concept still holds for unicast traffic.

Cyclic Waiting Deadlock

Unfortunately, the shared memory deadlock is not the only added complication. In order to maintain good switch throughput also under heavy multicast traffic, one must be able to transmit multiple multicast frames in parallel. Since every multicast frame's set of destinations can be any subset of all destinations, this leads to output conflicts. The shared memory, output-queued architecture of the novel switch allows to partially transmit frames, so that not all outputs need to be available before transmission, leading to higher throughput. However, this ability leads to possible deadlock conditions, as shall now be demonstrated.

Figure 4:
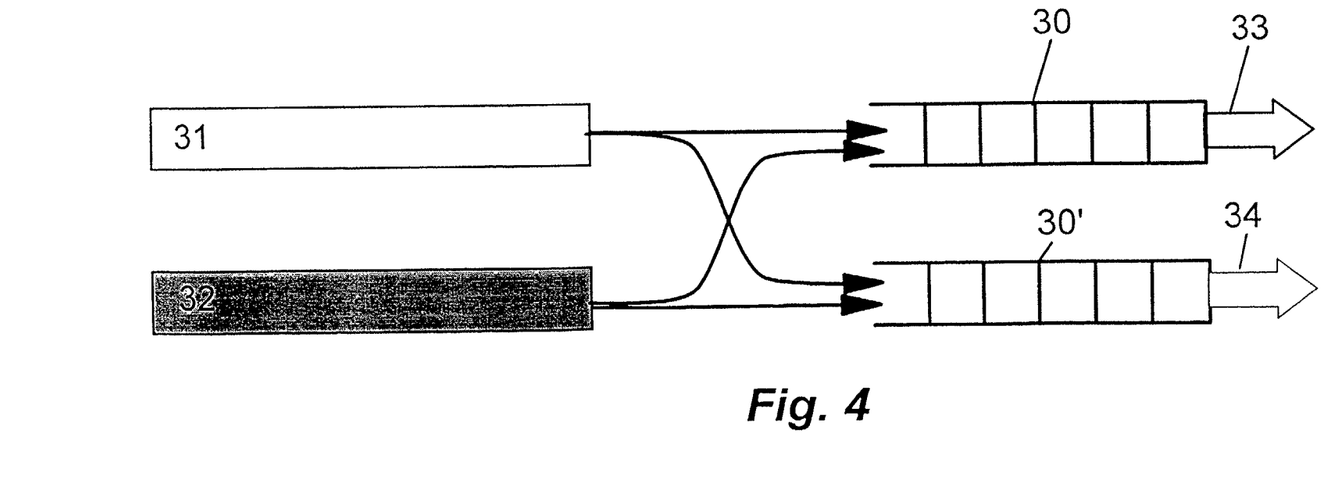
FIG. 4 a cyclic waiting multicast frame deadlock with two frames.

FIG. 4 illustrates the following case. Frame 31 from the first input has destinations on output 33 and 34. Frame 32 from the second input also has destinations on these two outputs. Both frames are very long. Frame 31 is active on output 33, frame 32 on output 34. Assumed is that these are the only two frames currently in the switch. Thus, according to Definition 2, neither frame is currently active, the memories 30 and 30' will fill up, and both will be blocked when the almost full threshold is crossed. At that point, frames 31 and 32 will be mutually waiting for the other's completion, which will never happen because neither is active, disallowing the required continuation cells from entering the switch. Hence, there is a deadlock which is fundamentally different from the shared memory deadlock and which cannot be prevented by the above described extended active concept alone.

Figure 5:
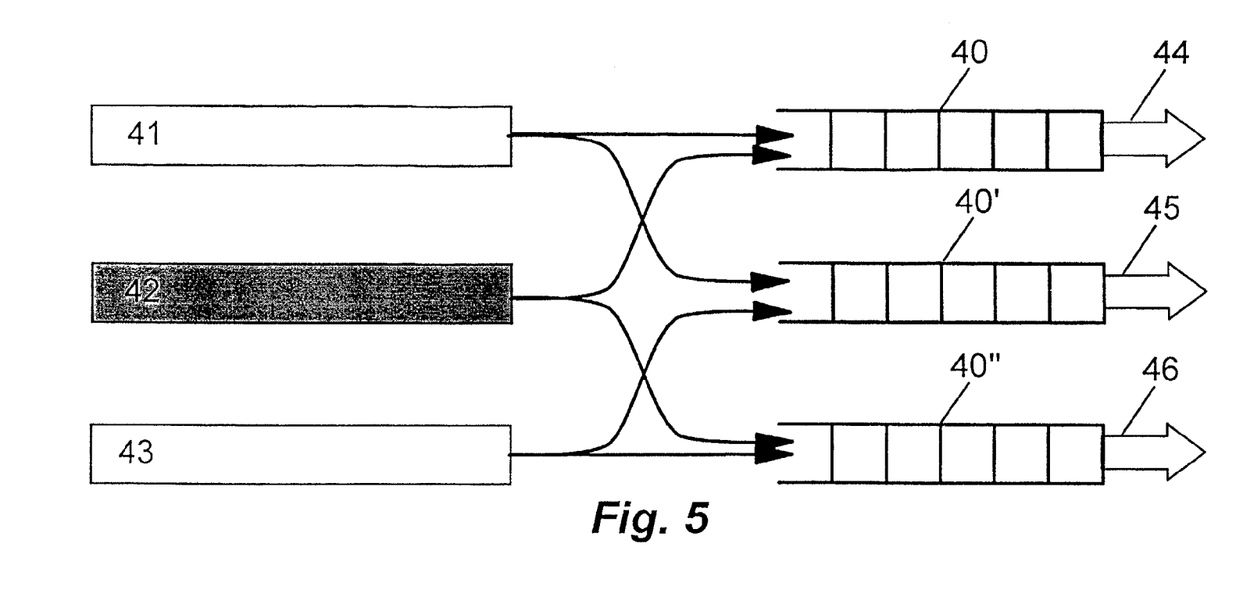
FIG. 5 a cyclic waiting multicast frame deadlock with three frames.

Note that it is not required that frames have at least two destinations in common for the deadlock to occur. Consider a three-frame scenario as depicted in FIG. 5 where frame 41 is destined for outputs 44 and 45, frame 42 goes to 44 and 46, and frame 43 to 45 and 46. Any two frames always have only one destination in common, but when frame 41 is active on output 44, 42 on 46, and 43 on 45, then 42 will be waiting for 41 to end, 41 for 43 to end and 43 for 42 to end, closing the vicious circle. The decision of which frame to send is governed by an arbiter on each output independently. The problem is that these independent decisions may cause cyclic waiting dependencies that cannot be broken once they exist. Therefore, one must prevent these cyclic waiting dependencies from occuring.

This cyclic dependency can be prevented by imposing a strict ordering rule on the way frames are stored in the output queues. This strict ordering relationship is satisfied if and only if a) frames waiting in the same output queue are served in first-in-first-out (FIFO) order according to their arrival times, and b) multicast frames that arrive simultaneously at different outputs are stored in the same relative order in all corresponding output queues.

This guarantees that a unique earliest frame always exists on every output, which does not have to wait for any other frame on any of its destinations. Therefore, cyclic waiting cannot occur and hence the deadlock condition is solved.

Frame Mode and Priorities

Adding QoS support by means of priorities (preemptive, weighted, or otherwise) introduces another dimension to the deadlock problem. We assume P to be the total number of traffic priorities supported by the switch. Every frame has an individual priority p. The ordering relations imposed on frames only apply to frames of the same priority. Frames of different priorities are allowed to be served in any order, decided by some given transmission arbitration scheme. One possibility is to always give precendence to frames of higher priority, so-called strict, or preemptive priorities. Cells of frames of different priorities may even be interleaved at both inputs and outputs.

Complications arise because frames with different priorities are allowed to be interleaved on an output. It can therefore happen that an output is flagged active on more than one input, but for different priorities. If no additional measures are taken, it can happen that, while in almost full state, cells from multiple frames are allowed to enter the output queue, whereas only one can exit. Thus, the active concept is broken.

Adding priorities implies that the input status flags have to be kept on a per priority basis, since it can occur that multiple frames are active simultaneously on the same output (one per priority), so the input status arrays from Definition 2 are now indexed per priority as well: $A_{p,i}(\bullet)$. Similarly, the shared memory grant and output queue grant information are provided on a per priority basis as well.

Switch operation in almost full mode can be restored by only giving grant to the priority for which a cell has left the switch in the current cycle. This is done by keeping track, for every output, from which input and priority a cell was last transmitted.

Definition 3: (Output Transmit Status) The output transmit status $B_{p,j}(i)$ is defined to be true when a cell of priority p from input i has been transmitted on output j in the current cycle or no cell has been transmitted at all, and false otherwise.

Definition 4 extends the extended active concept from Definition 2 to incorporate priorities.

Definition 4: (Transmit Active Concept) An input i is defined as being active with respect to priority p and output j when on output j a frame of priority p that arrived on input i is being transmitted and it is the last copy of the frame. The active states are represented by the boolean vectors $A_{p,i}(j)$. We maintain the notion of "active input", indicated by $A_{p,i}^*$.

$$A_{p,i}^* := \exists (j : 0 \leq j < N : A_{p,i}(j) = \text{true}) \qquad (7)$$

Additionally, an input is said to be transmit-active for priority p, represented by $A_{p,i}*$ when it is active with respect to at least one output which is marked active for this priority and input according to Definition 3:

$$A_{p,i}^* := \exists(j: 0 \leq j < N : A_{p,i}(j) = \text{true} \wedge B_{p,j}(i) = \text{true}) \quad (8)$$

The shared memory grant is newly defined by equation (9):

$$G_{p,i,SM} := (\neg(O_{SM} \geq T_{AF}) \vee A_{p,i}^*) \wedge \neg(O_{SM} \geq T_{SM}) \quad (9)$$

with $0 \leq p < P$, $0 \leq i < N$, $0 < j < N$.

Finally, we add a shared memory threshold per priority, thus arriving at equation (10):

$$G_{p,i,SM} := (((\neg(O_{p,SM} \geq T_{p,SM}) \vee A_{p,i}^*)$$
$$\wedge \neg(O_{SM} \geq T_{AF})) \vee ((O_{SM} \geq T_{AF}) \vee A_{p,i}^*))$$
$$\wedge \neg(O_{SM} \geq T_{SM}) \quad (10)$$

where $O_{p,SM}$ and $T_{p,SM}$ represent occupancy counters and thresholds per priority, respectively.

Output-queue grant is transmitted on a per priority basis in a cyclic fashion (one priority per cycle) but is otherwise not affected by adding priorities. The cyclic transmission implies that the output queue grant status on the adapter is updated only once every P cycles, increasing the hysteresis.

$$G_{p,i}(j) := \neg(O_{p,Q}(j) \geq T_{p,Q}(j)) \vee A_{p,i}(j) \quad (11)$$

Equation (11) assumes programmable thresholds per priority as well as queue occupancy counters per priority, although this is not of importance for the functioning of the deadlock prevention.

Equations (10) and (11) nicely demonstrate the four different deadlock prevention mechanisms we have introduced:

The active flag $A_{p,i}(j)$ in equation (11) prevents output queue deadlock.

The term $A_{p,i}^*$ in equation (10) prevents shared memory deadlock on the per priority thresholds.

The same term also prevents shared memory multicast deadlock by means of the extended active concept (only active when last copy is being processed).

The term $A^*_{p,i}$, also in equation (10), prevents shared memory deadlock when the shared memory is almost full. It incorporates both shared memory multicast deadlock and shared memory priority deadlock prevention.

Implementation

In the following, some practical considerations with regard to implementations and embodiments will be shown and described.

Shared Memory

Each shared memory address consists of storage space for one cell, plus an associated multicast counter. Each input controller has an address available in which to store the next arriving cell. When a cell arrives, several things happen:

the cell data is stored at the available memory address,
the address is stored in each destination output queue, as indicated by the destination bitmap in the cell's header, and
the number of destinations is counted and stored in the counter associated with the memory address.

Figure 9:
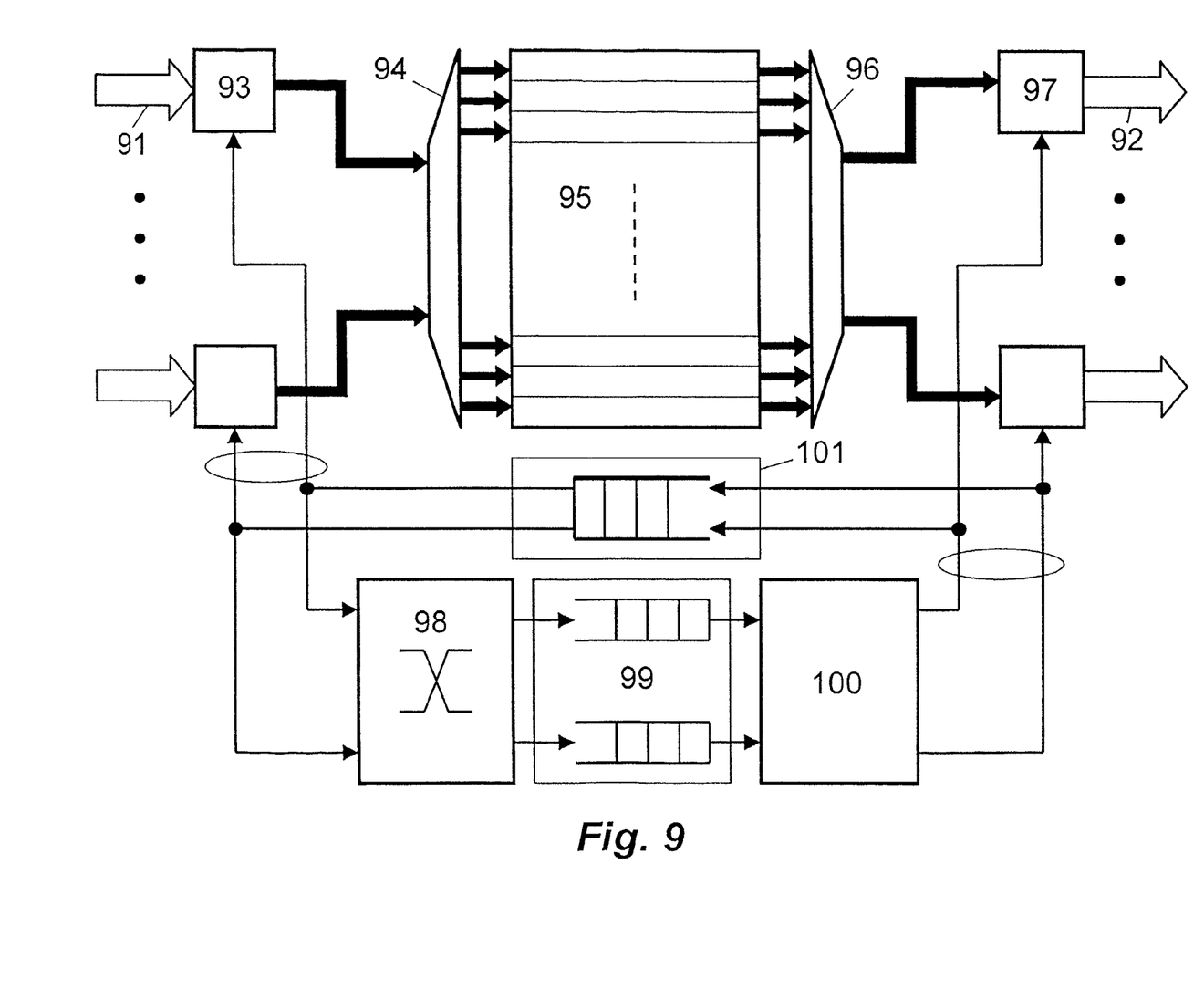
FIG. 9 a shared memory with split control and data paths.

FIG. 9 illustrates a shared memory implementation with split control and data paths. Cells arrive on a plurality of inputs 91 to be routed to a plurality of outputs 92. The input controllers 93 receive free storage addresses from the address manager 101. These input controllers 93 forward the cell data through an input routing structure 94 that routes the data to the correct location in the shared memory 95. The occupancy counter (not shown) corresponding to this shared memory location is initialized to the number of copies of this cell requested to be sent. The shared memory addresses are forwarded to the output queue access manager 98, that routes them one or more of destination output queues 99, as indicated by the destination information in the cell's header. The addresses are enqueued in the output queues 99. The output queue read manager 100 removes one addresses from each output queue 99 per cell slot, and forwards these addresses to the corresponding output controllers 97, which fetch the corresponding cell data from the shared memory 95 at the address received. The data is forwarded from the shared memory 95 through an output routing structure 96 to the output controllers 97. The addresses are returned to address manager 101, which decreases the corresponding occupancy counter (not shown) by 1 for each address returned. Those addresses for which the occupancy counter has reached zero are released to the free queue to be reused.

Frame Mode

The frame mode will be a configurable mode. When enabled, each output keeps track of which frame it is currently processing and will not process any other frames until the current one is completed.

Each cell carries a flag indicating whether it is a start-of-frame, continuation, or end-of-frame cell. When a start-of-frame cell of priority p, received on input i, is transmitted on output j and it is the last copy of the cell (the associated counter equals one), the output is marked active, and the corresponding bit j is set in the active register $A_{p,i}$. When an end-of-frame cell of priority p, received on input i, is transmitted on output j, the corresponding bit j in register $A_{p,i}$ is cleared, if set.

When any cell of priority p, received on input i, is transmitted on output j, the corresponding bit is set in the output transmit status register $B_{p,j}$.

These registers $A_{p,i}$ and $B_{p,j}$, $0 \leq i,j < N$, $0 \leq p < N$, are used to modify the grant signals as described in equations (10) and (11), for the shared memory and output queue grant, resp.

Output Queues

Figure 6:
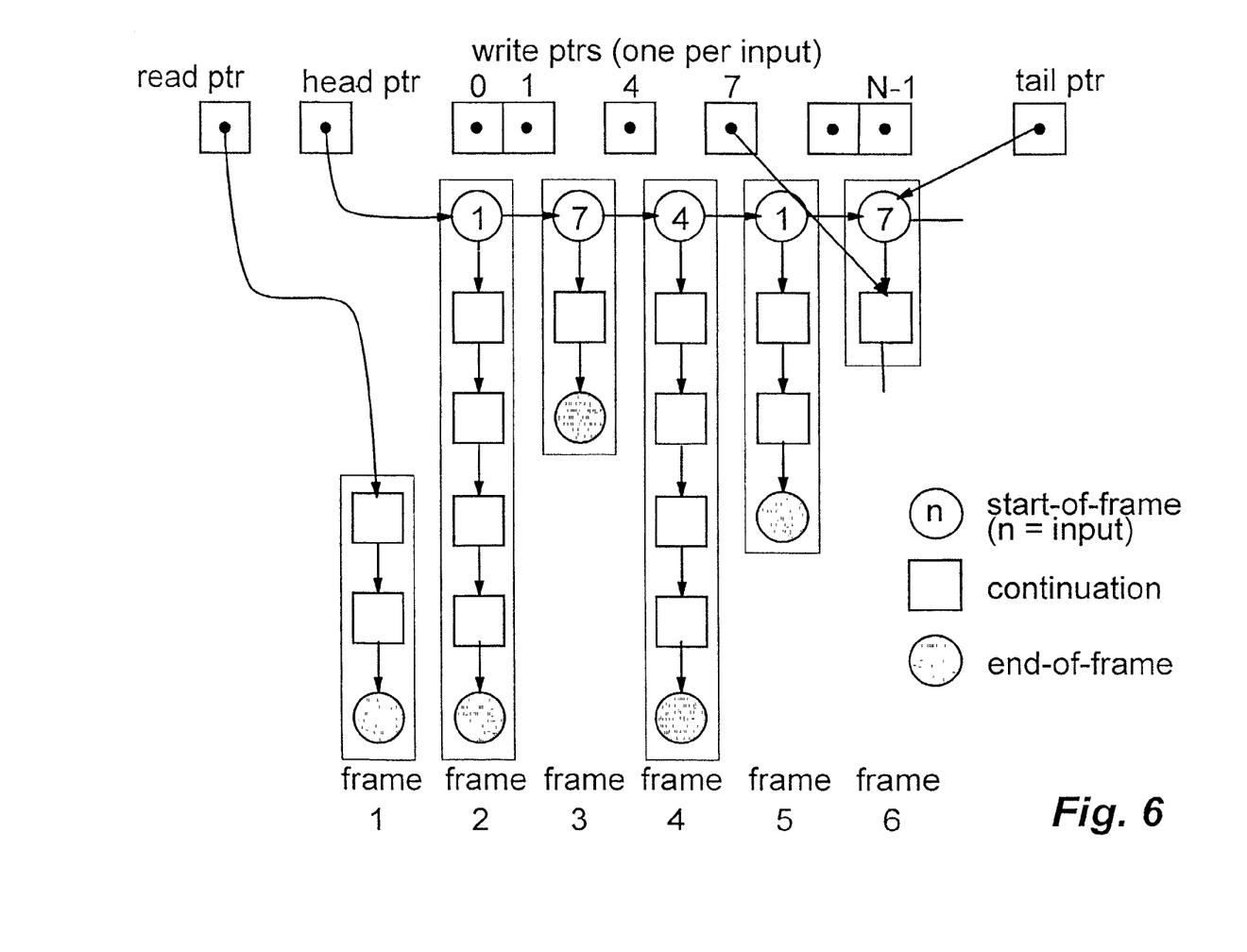
FIG. 6 an implementation for a logical output queue.

To enable frame mode, the output queues must maintain order information first to determine the order in which the stored frames are transmitted, and second to maintain the order of start-, continuation-, and end-of-frame cells for each frame. This can be achieved by means of a two-dimensional linked list as shown in FIG. 6. In the first, horizontal dimension, all the start-of-frame cells are linked together In the second dimension, the continuation and end-of-frame cells of the respective frames are linked.

Logical Operation

Every start-of-frame cell, SoF, requires two next-cell pointers, one to the start-of-frame cell of the next frame, and one to the first continuation cell of its own frame. Continuation cells only require one next-cell pointer, namely to the next continuation cell. End-of-frame cells, EoF, require no next-cell pointer at all. Note that a cell may be SoF and EoF simultaneously, if the frame consists of just a single cell.

Furthermore, every output queue maintains a number of additional pointers to manage its operation:

a read pointer, which indicates the next cell to be read from the queue,
a head pointer, which indicates the first SoF cell in the queue, a tail pointer, which points to the last SoF cell in the queue, in order to be able to immediately append newly arriving frames (start-of-frame cells) at the right position, and an array of N write pointers, one per input, which point to the last cell of any uncompleted frame from the corresponding input (at any given time, only one frame can be incomplete for any input-output pair). Newly arriving continuation cells are appended at the position indicated by the corresponding write pointer.

All pointers assume the value nil if they are currently invalid. In case multiple priorities are to be supported, one set of all of above-mentioned pointers is required for each priority.

We assume there is space for Q cells in every output queue OQ, and the queue slots are numbered 0 through Q−1. We assume that a given queue management scheme provides a queue slot q to store an incoming entry. Next, we will describe OQ operation in detail.

Initially, the output queue is empty and all pointers are nil. When a cell arrives, its memory storage address is passed to the destination output queue, along with the input number the cell arrived on, and the cell type (SoF, CoF, EoF, wherein CoF identifies a continuation cell). Depending on the type of the cell being written, the following three cases must be distinguished:

SoF: If the OQ is empty, the cell is entered in the queue at slot q, and the head, tail, and read pointers are all set to q. If not, the cell is appended at the tail of the queue as indicated by the tail pointer, i.e., the next SoF pointer of the tail pointer's entry is set to q, and the tail pointer is also set to q. In both cases, the corresponding write pointer is set to q also. This write pointer should be nil; if it isn't, there is an error condition, because the previous frame from the same input has not been completed yet. The last CoF (or SoF, if no CoF is present) should be marked as EoF, to force an end to the incomplete frame. If the head pointer equals nil, it is updated too.

CoF: the cell is entered in the queue at slot q. If the corresponding write pointer does not equal nil, the cell is linked to the previous cell of its frame by updating the next CoF pointer of the entry indicated by this write pointer, setting it to q, and the write pointer is also updated to q. If the write pointer equals nil, there are two possibilities, depending on the input the cell arrived on. If the input equals the one of the frame that's currently active (if there is one), the cell must belong to that same frame, and both the read pointer and the corresponding write pointer are set to q. Otherwise, there is an error condition, because apparently no SoF or CoF from the same input immediately preceded this cell, nor does it belong to the currently active frame; the incoming cell should then be flagged as SoF, and treated according to the previous bullet to remedy the situation. Additionally, if the OQ is empty, the read pointer is set to q. This can only occur if the cell belongs to the frame currently being transmitted, otherwise there is an error condition. If the new cell's input differs from the one of the frame currently being transmitted, or if there is no frame currently being transmitted, an error must have occurred. All cells from this input up to the next SoF should be discarded.

EoF: same as CoF, with the addition that the corresponding write pointer is set to nil, to indicate that the frame has been completed.

OQ read operations are executed as follows. If the read pointer equals nil, no cell is read, i.e., the queue is idle. Note that this is not equivalent to the queue being empty: the queue may be stalled due to absent continuation cells of the frame currently being served. If the read pointer is not nil, the cell indicated by the read pointer is read. Depending on the type of the cell being read, the following three cases must be distinguished:

SoF: the read pointer is updated to the next CoF entry of the cell. If the next-CoF value equals nil, then the read pointer will also become nil. This happens when a frame has not been completely received yet by the OQ. The tail pointer is set to the cell's next SoF entry (may be nil). The head pointer is updated to the cell's next SoF entry (may also be nil).

CoF: the read pointer is updated to the next CoF entry of the cell.

EoF: the read pointer is updated to the value of the head pointer. If the head pointer now equals nil, the tail pointer is also set to nil.

In all three cases it must additionally be checked whether the queue entry just read is being pointed to by the write pointer of the corresponding input (the input the cell being read arrived on). If this is the case, both the write pointer in question and the read pointer must be set to nil. The OQ also keeps track of the input number of frames currently being transmitted.

FIG. 6 shows a logical output queue implementation. Frame 1 is currently being transmitted with the read pointer indicating the next cell to be read, while frame 6 is currently being received from input 7, with the corresponding input pointer indicating the last continuation cell of this frame. Note how the start-of-frame cells are linked together in the horizontal direction, with the head and tail pointers indicating the first and last frame in the queue.

Physical Implementation

Figure 7:
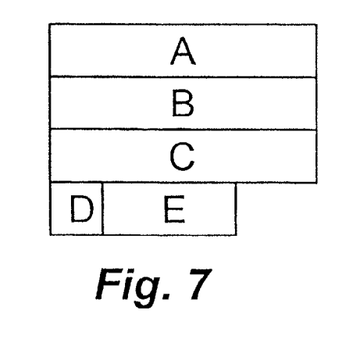
FIG. 7 a format for an output queue entry.

The price paid for supporting frame mode is that every queue entry needs two next-cell pointers, one to point to the next start-of-frame, one to point to the next continuation cell, even though only the start-of-frame cells really need both pointers. FIG. 7 shows the fields that constitute a single entry in an output queue in such a simple implementation. The switch dimension equals N ports, and the shared memory size equals M cells. Every output queue is of size Q, i.e., the queue can store up to Q entries.

FIG. 7 shows the fields that constitute a single entry in an output queue, i.e. the output queue entry format.

In this figure,

| The following table shows the queue entry field sizes | | |
| --- | --- | --- |
| field | meaning | size (bits) |
| A | data memory address | $\log_2 M$ |
| B | next start-of-frame address | $\log_2 Q$ |
| C | next continuation cell address | $\log_2 Q$ |
| D | cell type identifier | 2 |
| E | input identifier | $\log_2 N$ |

A is the memory address,
B is the next start-of-frame,
C is the next continuation,
D is the cell type identifier, and
E is the input identifier.

The above sizes of the individual queue entry fields amount to a total of ($\log_2$ M+2+$\log_2$ Q+$\log_2$ N+2) bits per entry, for a total of NQ($\log_2$ M+2+$\log_2$ Q+$\log_2$ N+2). This implementation is alternative 'a'.

Figure 8:
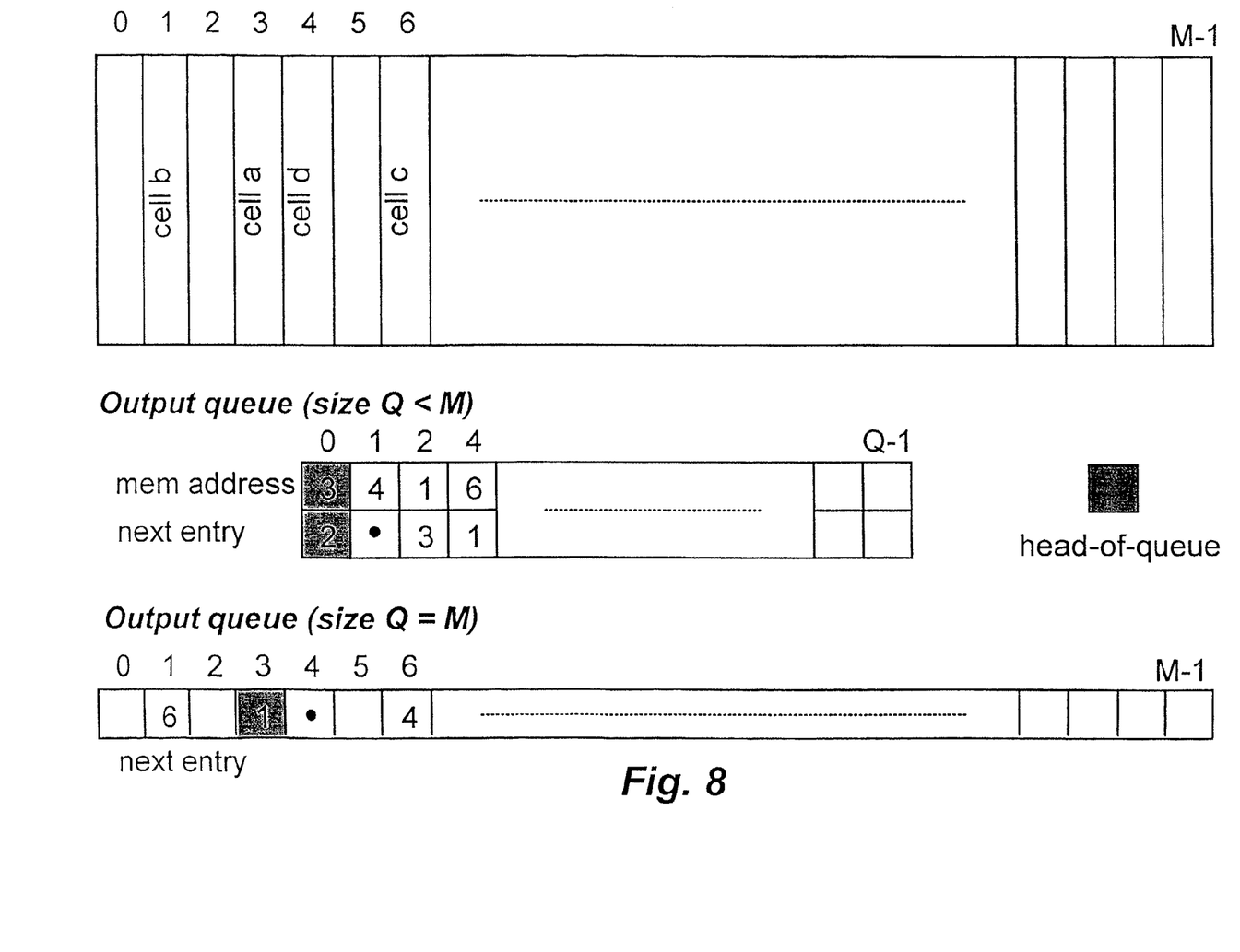
FIG. 8 a comparison of output queue size vs. implementation.

FIG. 8 depicts an example for a shared memory in its upper section and below two variations of an output queue, displaying the output queue size vs. implementation. The central section shows an output queue for Q<M, wherein Q is the output queue size and M is the shared memory size, and the section at the bottom of the page an output queue of size Q=M.

The shared memory consists of M packet locations numbered 0 through M−1 as shown. Below, two OQ implementation alternatives are shown. The first OQ implementation has queue size Q smaller than memory size M. The queue slots are numbered 0 through Q−1. This implementation requires two fields per queue entry to build the linked list, namely the memory address of the current entry, and the queue slot of the next queue entry. The second implementation below, with queue size Q=M, requires only the next queue slot to build the linked list, as shown.

An improvement can be achieved by sizing the output queues up to the shared memory size, Q=M. This may seem wasteful at first, but there are several advantages, which will be explained with the help of FIG. 8.

First, although the queue has more entries, the individual entries can become smaller, because there is no longer a need to actually store the memory address in the queue by instituting a one-to-one correspondence between the place in the queue and the memory address, which is not possible with a queue that is smaller than the memory. On top of that, a smaller queue will need its own free queue with the associated queue management logic, not shown in FIG. 8. As an example, the figure demonstrates how the sequence of cells {a; b; c; d} is linked up in both implementations. The queue entry size in this implementation equals (2$\log_2$ M+$\log_2$ N+2) for a total of NM(2$\log_2$ M+$\log_2$ N+2). This implementation is alternative 'b'.

Further improvements are possible by observing that SoF entries only require a next-SoF pointer, whereas CoF entries only require a next-CoF pointer. Additionally, the input identifier need only be stored with SoF entries. These observations suggest an implementation where queues for SoF and CoF entries are separated. We can make a large saving by realizing that the order of CoF cells of a given frame is identical on all outputs, by the definition of a frame; that is, CoF order does not have to be maintained on a per-output basis. This implies that only one CoF queue (also of size M) is needed, along with N SoF queues.

In terms of the previous table this means that the SoF queues store fields B and E, and the CoF queue stores field C. Since the type of cell is already implicit in the queue it is stored in, only a 1-bit cell type identifier to flag EoF cells is required (for entries in all queues).

The resulting implementation requires NM ($\log_2$ M+$\log_2$ N+1), bits for the SoF queues plus M($\log_2$ M+1) bits for the CoF queue, for a total of (N+1)M($\log_2$ M+1)+NM $\log_2$ N bits. This is the final implementation alternative 'c'.

The following table compares the implementation complexities of the three proposed alternatives, expressed in the total number of bits of storage required.

| Implementation | Complexity (bits of storage) |
|---|---|
| a(N,Q,M) | NQ($\log_2$ M + 2$\log_2$ Q + $\log_2$ N + 2) |
| b(N,M) | NM(2 $\log_2$ M + $\log_2$ N + 2) |
| c(N,M) | (N + 1) M ($\log_2$ M + 1) + NM $\log_2$ N |

To avoid cyclic waiting deadlock conditions, a strict enqueuing order must be satisfied. This can be achieved as follows: The output queues follow a strict FIFO discipline on a per frame basis. Frames that arrive at one output queue simultaneously are ordered according to a predetermined order of their respective input numbers. This can be round robin, or any other suitable ordering scheme. The key point in realizing the strict timing order is to make sure that this order is identical at all outputs. However, the order of inputs must not be identical in subsequent time slots. For reasons of fairness, the order may be suitably rearranged at every time slot.

Thus, the present invention presents a way to integrate support for both frame mode operation and multicast in an output-queue shared memory cell switch. It has been shown how deadlock situation in both unicast and multicast frame mode can be avoided, also an overview of how to implement these schemes has been given.

While the present invention has been described theoretically and by way of examples, these shall not limit the scope of protection since it is obvious to someone skilled in the art that the invention can be easily adapted to match many requirements in the field of switches and switching fabrics.

The invention claimed is:

1. A method for providing routing capability for variable-length unit traffic in a fixed-length cell routing switch with a shared memory and a plurality of registers each associated with a particular input and a particular output of said switch comprising the steps of:

segmenting an incoming variable-length unit, a frame, into a plurality of fixed-length cells including a start-of-frame cell, one or more continuation cell(s), and an end-of-frame cell, routing said fixed-length cells through said switch, by
      defining a predetermined first condition for said shared memory,
      defining a predetermined second condition for said frame and its cells,
      controlling a cell's entry into said shared memory depending upon said first condition, and
      controlling transmission of a said cell of said frame depending upon said second condition; and storing an indication that said particular output is "active" with respect to said particular input, said indication being set when a start-of-frame cell of one of the copies a specific frame received on said particular input is transmitted on said particular output and said one of the copies is the last copy of the specific frame to be transmitted, and said indication being reset when the corresponding end-of-frame cell is transmitted at said particular output.

2. The method according to claim 1, wherein further a frame to be transmitted is assigned a multicast vector indicating a plurality of outputs of the switch.

3. The method according to claim 1, wherein further
a frame to be transmitted is assigned a priority and,
at an output of the switch, transmission of cells of a flame with a lower priority is interrupted when a frame with a higher priority is to be transmitted at said same output.

4. The method according to claim 3, wherein
transmission of cells of the frame with the lower priority is resumed when the frame with the higher priority is fully transmitted.

5. The method according to claim 1, wherein
the first condition controls a cell's entry into the shared memory by granting entry if and only if
there is space available in said shared memory AND
a predetermined shared memory threshold condition, indicating that a limited memory space is available, is not met in said shared memory OR an "active frame" condition is met, indicating that a certain frame's start-of-frame cell has been transmitted, but not its end-of-frame cell.

6. The method according to claim 5, wherein
the predetermined shared memory threshold condition for said shared memory a programmable threshold below a "memory full" threshold, i.e. the total space available in said memory.

7. The method according to claim 6, wherein
the predetermined shared memory threshold condition $T_{AF}$ is smaller or equal to the "memory full" threshold $T_{SM}$ minus D times the number of ports N of the switch, $$T_{AF} T_{SM} - D\ N,$$

D being the flow control delay in cells in the switch.

8. The method according to claim 1, wherein
the second condition allows a cell's transmission through the switch to a certain output if and only if
the output queue associated to said certain output has not exceeded its predetermined output queue threshold OR
said cell is marked "active" for said certain output, i.e. belonging to an "active frame" whose start-of-frame cell has been transmitted, but not its end-of-frame cell.

9. The method according to claim 1, wherein each output keeps track of which frame is currently "active", and is being transmitted, and
will not process any other frame until the end-of-frame cell of said current one is transmitted.

10. The method according to claim 1, wherein
each cell is assigned a flag indicating whether it is a start-of-frame cell, a continuation cell or an end-of-frame cell.

11. The method according to claim 1, wherein
the second condition controlling a cell's transmission through the switch to a certain output is extended to include multicast deadlock prevention by defining a frame to be "active" if and only if the last copy of the frame is being transmitted, so that said second condition allows a cell's transmission if at least one of the following are true;
the output queue associated to said certain output has not exceeded its predetermined output queue threshold; and
said cell is marked "active" for said certain output, whereby said cell belongs to the last copy of an "active frame" whose start-of-frame cell has been transmitted, but not its end-of-frame cell.

12. The method according to claim 1, wherein
the second condition controlling a cell's transmission through the switch to a certain output is extended to include frame priority deadlock prevention by defining a frame to be "active" if its highest priority is being transmitted, so that said second condition allows a cell's transmission if and only if
the output queue associated to said certain output has not exceeded its predetermined output queue threshold; or
said cell is marked "active" for said certain output, whereby said cell belongs to the highest priority of an "active frame" whose start-of-frame cell has been transmitted, but not its end-of-frame cell.

13. A fixed-length cell routing switch providing routing capability for variable-length unit traffic comprising:
a shared memory, characterized in that each address of said memory includes storage space for one cell, and an associated multicast counter for, when a cell of a variable-length unit arrives, providing means for storing the cell's data at an available memory address, storing said used address in each destination output queue, and counting and storing the number of destinations in said counter
a plurality of registers, each associated with a particular input and a particular output of said switch for storing an indication, preferably a bit, indicating that said particular output is "active" with respect to said particular input,
said indication being set when a start-of-frame cell of one of the copies a specific frame received on said particular input is transmitted on said particular output and said one of the copies is the last copy of the specific frame to be transmitted, and
said indication being reset when the corresponding end-of-frame cell is transmitted at said particular output.

14. The routing switch according to claim 13, further including
means for assigning a priority to a frame to be transmitted and
means for interrupting and/or resuming transmission of cells of a frame with a lower priority whenever a frame with a higher priority is to be transmitted at the same output.

15. A fixed-length cell routing switch providing routing capability for variable-length unit traffic comprising:
a shared memory, characterized in that each address of said memory includes storage space for one cell of a variable-length unit and an associated multicast counter for, when a cell arrives, providing means for storing the cell's data at an available memory address, storing said used address in each destination output queue, and counting and storing the number of destinations in said counter;
a plurality of registers, each associated with a particular priority, a particular input, and a particular output of said switch for storing an indication, preferably a bit, indicating that said particular output is "active" with respect to said particular input and said particular priority,
said indication being set when a start-of-frame cell of one of the copies a specific frame of said particular priority, received on said particular input, is transmitted on said particular output and said one of the copies is the last copy of the specific frame to be transmitted, and said indication being reset when the corresponding end-of-frame cell is transmitted at said particular output, a plurality of registers, each associated with a particular priority, a particular input, and a particular output of said switch for storing an indication, preferably a bit, indicating that said particular output is "transmit active" with respect to said particular input and said particular priority, said indication being set when either a cell of a specific frame of said particular priority, received on said particular input, has been transmitted on said particular output in the current packet cycle, or no cell has been transmitted at all on said particular output, and said indication being reset otherwise.

* * * * *